United States Patent
Plunkett et al.

(10) Patent No.: US 8,115,967 B2
(45) Date of Patent: Feb. 14, 2012

(54) LOCALIZED SIGNAL DATA PRESERVATION WITHIN SIGNAL BANDWIDTH

(75) Inventors: Richard Thomas Plunkett, Balmain (AU); Raul Evelio Vera, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 1478 days.

(21) Appl. No.: 11/563,684

(22) Filed: Nov. 28, 2006

(65) Prior Publication Data

US 2008/0123969 A1     May 29, 2008

(51) Int. Cl.
    *H04N 1/41* (2006.01)
(52) U.S. Cl. .............. 358/426.01; 358/448; 358/3.22; 358/3.14; 375/240; 382/269; 382/275; 348/606
(58) Field of Classification Search .......... 358/448, 358/463, 426.01–426.16, 539, 3.22; 382/254–275, 382/284, 232; 345/660; 375/240.01–240.29; 348/606
See application file for complete search history.

(56) References Cited

U.S. PATENT DOCUMENTS

| | | | |
|---|---|---|---|
| 5,434,931 A * | 7/1995 | Quardt et al. .................. | 382/271 |
| 5,495,538 A * | 2/1996 | Fan ................................ | 382/233 |
| 5,546,194 A * | 8/1996 | Ross ............................. | 358/445 |
| 5,563,962 A * | 10/1996 | Peters et al. .................... | 382/261 |
| 5,883,983 A * | 3/1999 | Lee et al. ....................... | 382/268 |
| 5,917,952 A * | 6/1999 | Noh ............................. | 358/3.07 |
| 5,966,465 A * | 10/1999 | Keith et al. .................... | 382/232 |
| 6,192,076 B1 * | 2/2001 | Kondo ...................... | 375/240.12 |
| 6,201,614 B1 * | 3/2001 | Lin ............................... | 358/3.13 |
| 6,259,823 B1 * | 7/2001 | Lee et al. ....................... | 382/268 |
| 6,633,684 B1 * | 10/2003 | James ........................... | 382/274 |
| 6,707,578 B1 | 3/2004 | Bradburn | |
| 6,771,793 B1 | 8/2004 | Yamada | |
| 6,795,588 B1 * | 9/2004 | Nio et al. ....................... | 382/261 |
| 6,920,252 B2 | 7/2005 | Rouvellou | |
| 7,224,832 B2 * | 5/2007 | Yamada ........................ | 382/166 |
| 7,254,277 B2 * | 8/2007 | Kempf et al. .................. | 382/260 |
| 7,254,777 B2 * | 8/2007 | Hayes et al. ................... | 715/734 |

(Continued)

FOREIGN PATENT DOCUMENTS

EP     1235184 A2     8/2002

(Continued)

OTHER PUBLICATIONS

Vander Kam et al., "JPEG-comllant perceptual coding for a grayscale image printing pipeline", IEEE Transactions on Image Processing, vol. *, Issue1, Jan. 1999, pp. 1-14.

*Primary Examiner* — Twyler Haskins
*Assistant Examiner* — Dennis Dicker

(57) ABSTRACT

A system and method for reducing the noise induced in a particular section or level of a signal bandwidth. The section is isolated from the rest of the signal data, by rescaling this data to produce a buffer section adjacent the section with little or no data in it. The signal is then transmitted to the output device where all data is the buffer section is considered to be the result of noise, and is mapped back to the predetermined level. The signal data is inversely rescaled to move data back into the buffer section. In this way, more of the data that was input at the predetermined level, will also be at the predetermined level afterwards, thereby correcting noise induced in that level by noise inducing transmission techniques such as JPEG compression.

10 Claims, 8 Drawing Sheets

U.S. PATENT DOCUMENTS

| | | | |
|---|---|---|---|
| 7,466,364 B2 * | 12/2008 | Wischermann | 348/607 |
| 7,532,767 B2 * | 5/2009 | Oztan et al. | 382/268 |
| 7,561,750 B2 * | 7/2009 | Shinbata | 382/254 |
| 7,734,089 B2 * | 6/2010 | Zhang et al. | 382/181 |
| 7,912,316 B2 * | 3/2011 | Sasada | 382/275 |
| 2001/0046320 A1 * | 11/2001 | Nenonen et al. | 382/169 |
| 2002/0003905 A1 | 1/2002 | Sato et al. | |
| 2002/0158975 A1 | 10/2002 | Hiroshige et al. | |
| 2003/0016881 A1 * | 1/2003 | Matsuura | 382/274 |
| 2003/0099406 A1 * | 5/2003 | Georgiev et al. | 382/268 |
| 2003/0138166 A1 * | 7/2003 | Matsutani et al. | 382/275 |
| 2005/0031201 A1 * | 2/2005 | Goh | 382/169 |
| 2005/0074062 A1 * | 4/2005 | Sung et al. | 375/240.2 |
| 2006/0104538 A1 * | 5/2006 | Izumi | 382/275 |
| 2010/0110093 A1 * | 5/2010 | Nystad et al. | 345/584 |

FOREIGN PATENT DOCUMENTS

WO   WO 2006/106919 A1   10/2006

* cited by examiner

LOCALIZED SIGNAL DATA PRESERVATION WITHIN SIGNAL BANDWIDTH

FIELD OF THE INVENTION

The present invention relates to electronic signal processing and in particular, reducing the level of noise in localized parts of a signal's bandwidth.

CO-PENDING APPLICATIONS

The following applications have been filed by the Applicant simultaneously with the present application:

| IJ70US | IJ71US | IJ72US | IJ73US | IJ74US | IJ75US |
| --- | --- | --- | --- | --- | --- |

The disclosures of these co-pending applications are incorporated herein by reference. The above applications have been identified by their filing docket number, which will be substituted with the corresponding application number, once assigned.

CROSS REFERENCES

The following patents or patent applications filed by the applicant or assignee of the present invention are hereby incorporated by cross-reference.

| | | | | | | |
| --- | --- | --- | --- | --- | --- | --- |
| 09/517,539 | 6,566,858 | 6,331,946 | 6,246,970 | 6,442,525 | 09/517,384 | 09/505,951 |
| 6,374,354 | 09/517,608 | 6,816,968 | 6,757,832 | 6,334,190 | 6,745,331 | 09/517,541 |
| 10/203,559 | 10/203,560 | 7,093,139 | 10/636,263 | 10/636,283 | 10/866,608 | 10/902,889 |
| 10/902,833 | 10/940,653 | 10/942,858 | 10/727,181 | 10/727,162 | 10/727,163 | 10/727,245 |
| 7,121,639 | 10/727,233 | 10/727,280 | 10/727,157 | 10/727,178 | 7,096,137 | 10/727,257 |
| 10/727,238 | 10/727,251 | 10/727,159 | 10/727,180 | 10/727,179 | 10/727,192 | 10/727,274 |
| 10/727,164 | 10/727,161 | 10/727,198 | 10/727,158 | 10/754,536 | 10/754,938 | 10/727,227 |
| 10/727,160 | 10/934,720 | 11/212,702 | 11/272,491 | 11/474,278 | 11/488,853 | 11/488,841 |
| 10/296,522 | 6,795,215 | 7,070,098 | 09/575,109 | 6,805,419 | 6,859,289 | 6,977,751 |
| 6,398,332 | 6,394,573 | 6,622,923 | 6,747,760 | 6,921,144 | 10/884,881 | 7,092,112 |
| 10/949,294 | 11/039,866 | 11/123,011 | 6,986,560 | 7,008,033 | 11/148,237 | 11/248,435 |
| 11/248,426 | 11/478,599 | 11/499,749 | 10/922,846 | 10/922,845 | 10/854,521 | 10/854,522 |
| 10/854,488 | 10/854,487 | 10/854,503 | 10/854,504 | 10/854,509 | 10/854,510 | 7,093,989 |
| 10/854,497 | 10/854,495 | 10/854,498 | 10/854,511 | 10/854,512 | 10/854,525 | 10/854,526 |
| 10/854,516 | 10/854,508 | 10/854,507 | 10/854,515 | 10/854,506 | 10/854,505 | 10/854,493 |
| 10/854,494 | 10/854,489 | 10/854,490 | 10/854,492 | 10/854,491 | 10/854,528 | 10/854,523 |
| 10/854,527 | 10/854,524 | 10/854,520 | 10/854,514 | 10/854,519 | 10/854,513 | 10/854,499 |
| 10/854,501 | 10/854,500 | 10/854,502 | 10/854,518 | 10/854,517 | 10/934,628 | 11/212,823 |
| 11/499,803 | 11/544,764 | 11/544,765 | 11/544,772 | 11/544,773 | 11/544,774 | 11/544,775 |
| 11/544,776 | 11/544,766 | 11/544,767 | 11/544,771 | 11/544,770 | 11/544,769 | 11/544,777 |
| 11/544,768 | 11/544,763 | 10/728,804 | 7,128,400 | 7,108,355 | 6,991,322 | 10/728,790 |
| 7,118,197 | 10/728,970 | 10/728,784 | 10/728,783 | 7,077,493 | 6,962,402 | 10/728,803 |
| 10/728,780 | 10/728,779 | 7,118,198 | 10/773,204 | 10/773,198 | 10/773,199 | 6,830,318 |
| 10/773,201 | 10/773,191 | 10/773,183 | 7,108,356 | 7,118,202 | 10/773,186 | 10/773,200 |
| 10/773,185 | 10/773,192 | 10/773,197 | 10/773,203 | 10/773,187 | 10/773,202 | 10/773,188 |
| 7,118,201 | 7,111,926 | 10/773,184 | 7,018,021 | 11/060,751 | 11/060,805 | 11/188,017 |
| 7,128,402 | 11/298,774 | 11/329,157 | 11/490,041 | 11/501,767 | 11/499,736 | 11/505,935 |
| 11/506,172 | 11/505,846 | 11/505,857 | 11/505,856 | 11/524,908 | 11/524,938 | 11/524,900 |
| 11/524,912 | 11/592,999 | 11/592,995 | 6,746,105 | 10/407,212 | 10/407,207 | 10/683,064 |
| 10/683,041 | 6,750,901 | 6,476,863 | 6,788,336 | 11/097,308 | 11/097,309 | 11/097,335 |
| 11/097,299 | 11/097,310 | 11/097,213 | 11/210,687 | 11/097,212 | 11/212,637 | 11/545,509 |
| 10/760,272 | 10/760,273 | 7,083,271 | 10/760,182 | 7,080,894 | 10/760,218 | 7,090,336 |
| 10/760,216 | 10/760,233 | 10/760,246 | 7,083,257 | 10/760,243 | 10/760,201 | 10/760,185 |
| 10/760,253 | 10/760,255 | 10/760,209 | 7,118,192 | 10/760,194 | 10/760,238 | 7,077,505 |
| 10/760,235 | 7,077,504 | 10/760,189 | 10/760,262 | 10/760,232 | 10/760,231 | 10/760,200 |
| 10/760,190 | 10/760,191 | 10/760,227 | 7,108,353 | 7,104,629 | 11/446,227 | 11/454,904 |
| 11/472,345 | 11/474,273 | 11/478,594 | 11/474,279 | 11/482,939 | 11/482,950 | 11/499,709 |
| 11/592,984 | 10/815,625 | 10/815,624 | 10/815,628 | 10/913,375 | 10/913,373 | 10/913,374 |
| 10/913,372 | 10/913,377 | 10/913,378 | 10/913,380 | 10/913,379 | 10/913,376 | 7,122,076 |
| 10/986,402 | 11/172,816 | 11/172,815 | 11/172,814 | 11/482,990 | 11/482,986 | 11/482,985 |
| 11/454,899 | 11/583,942 | 11/592,990 | 60/851,754 | 11/003,786 | 11/003,616 | 11/003,418 |
| 11/003,334 | 11/003,600 | 11/003,404 | 11/003,419 | 11/003,700 | 11/003,601 | 11/003,618 |
| 11/003,615 | 11/003,337 | 11/003,698 | 11/003,420 | 6,984,017 | 11/003,699 | 11/071,473 |
| 11/003,463 | 11/003,701 | 11/003,683 | 11/003,614 | 11/003,702 | 11/003,684 | 11/003,619 |
| 11/003,617 | 11/293,800 | 11/293,802 | 11/293,801 | 11/293,808 | 11/293,809 | 11/482,975 |
| 11/482,970 | 11/482,968 | 11/482,972 | 11/482,971 | 11/482,969 | 11/246,676 | 11/246,677 |
| 11/246,678 | 11/246,679 | 11/246,680 | 11/246,681 | 11/246,714 | 11/246,713 | 11/246,689 |
| 11/246,671 | 11/246,670 | 11/246,669 | 11/246,704 | 11/246,710 | 11/246,688 | 11/246,716 |
| 11/246,715 | 11/293,832 | 11/293,838 | 11/293,825 | 11/293,841 | 11/293,799 | 11/293,796 |
| 11/293,797 | 11/293,798 | 11/293,804 | 11/293,840 | 11/293,803 | 11/293,833 | 11/293,834 |
| 11/293,835 | 11/293,836 | 11/293,837 | 11/293,792 | 11/293,794 | 11/293,839 | 11/293,826 |
| 11/293,829 | 11/293,830 | 11/293,827 | 11/293,828 | 11/293,795 | 11/293,823 | 11/293,824 |
| 11/293,831 | 11/293,815 | 11/293,819 | 11/293,818 | 11/293,817 | 11/293,816 | 10/760,254 |
| 10/760,210 | 10/760,202 | 10/760,197 | 10/760,198 | 10/760,249 | 10/760,263 | 10/760,196 |
| 10/760,247 | 10/760,223 | 10/760,264 | 10/760,244 | 7,097,291 | 10/760,222 | 10/760,248 |
| 7,083,273 | 10/760,192 | 10/760,203 | 10/760,204 | 10/760,205 | 10/760,206 | 10/760,267 |
| 10/760,270 | 10/760,259 | 10/760,271 | 10/760,275 | 10/760,274 | 7,121,655 | 10/760,184 |
| 10/760,195 | 10/760,186 | 10/760,261 | 7,083,272 | 11/501,771 | 11/583,874 | 11/014,764 |
| 11/014,763 | 11/014,748 | 11/014,747 | 11/014,761 | 11/014,760 | 11/014,757 | 11/014,714 |
| 11/014,713 | 11/014,762 | 11/014,724 | 11/014,723 | 11/014,756 | 11/014,736 | 11/014,759 |
| 11/014,758 | 11/014,725 | 11/014,739 | 11/014,738 | 11/014,737 | 11/014,726 | 11/014,745 |

-continued

| | | | | | | |
|---|---|---|---|---|---|---|
| 11/014,712 | 11/014,715 | 11/014,751 | 11/014,735 | 11/014,734 | 11/014,719 | 11/014,750 |
| 11/014,749 | 11/014,746 | 11/014,769 | 11/014,729 | 11/014,743 | 11/014,733 | 11/014,754 |
| 11/014,755 | 11/014,765 | 11/014,766 | 11/014,740 | 11/014,720 | 11/014,753 | 11/014,752 |
| 11/014,744 | 11/014,741 | 11/014,768 | 11/014,767 | 11/014,718 | 11/014,717 | 11/014,716 |
| 11/014,732 | 11/014,742 | 11/097,268 | 11/097,185 | 11/097,184 | 11/293,820 | 11/293,813 |
| 11/293,822 | 11/293,812 | 11/293,821 | 11/293,814 | 11/293,793 | 11/293,842 | 11/293,811 |
| 11/293,807 | 11/293,806 | 11/293,805 | 11/293,810 | 09/575,197 | 7,079,712 | 09/575,123 |
| 6,825,945 | 09/575,165 | 6,813,039 | 6,987,506 | 7,038,797 | 6,980,318 | 6,816,274 |
| 7,102,772 | 09/575,186 | 6,681,045 | 6,728,000 | 09/575,145 | 7,088,459 | 09/575,181 |
| 7,068,382 | 7,062,651 | 6,789,194 | 6,789,191 | 6,644,642 | 6,502,614 | 6,622,999 |
| 6,669,385 | 6,549,935 | 6,987,573 | 6,727,996 | 6,591,884 | 6,439,706 | 6,760,119 |
| 09/575,198 | 6,290,349 | 6,428,155 | 6,785,016 | 6,870,966 | 6,822,639 | 6,737,591 |
| 7,055,739 | 09/575,129 | 6,830,196 | 6,832,717 | 6,957,768 | 09/575,162 | 09/575,172 |
| 09/575,170 | 7,106,888 | 7,123,239 | 11/246,707 | 11/246,706 | 11/246,705 | 11/246,708 |
| 11/246,693 | 11/246,692 | 11/246,696 | 11/246,695 | 11/246,694 | 11/482,958 | 11/482,955 |
| 11/482,962 | 11/482,963 | 11/482,956 | 11/482,954 | 11/482,974 | 11/482,957 | 11/482,987 |
| 11/482,959 | 11/482,960 | 11/482,961 | 11/482,964 | 11/482,965 | 11/495,815 | 11/495,816 |
| 11/495,817 | 11/124,158 | 11/124,196 | 11/124,199 | 11/124,162 | 11/124,202 | 11/124,197 |
| 11/124,154 | 11/124,198 | 11/124,153 | 11/124,151 | 11/124,160 | 11/124,192 | 11/124,175 |
| 11/124,163 | 11/124,149 | 11/124,152 | 11/124,173 | 11/124,155 | 11/124,157 | 11/124,174 |
| 11/124,194 | 11/124,164 | 11/124,200 | 11/124,195 | 11/124,166 | 11/124,150 | 11/124,172 |
| 11/124,165 | 11/124,186 | 11/124,185 | 11/124,184 | 11/124,182 | 11/124,201 | 11/124,171 |
| 11/124,181 | 11/124,161 | 11/124,156 | 11/124,191 | 11/124,159 | 11/124,175 | 11/124,188 |
| 11/124,170 | 11/124,187 | 11/124,189 | 11/124,190 | 11/124,180 | 11/124,193 | 11/124,183 |
| 11/124,178 | 11/124,177 | 11/124,148 | 11/124,168 | 11/124,167 | 11/124,179 | 11/124,169 |
| 11/187,976 | 11/188,011 | 11/188,014 | 11/482,979 | 11/228,540 | 11/228,500 | 11/228,501 |
| 11/228,530 | 11/228,490 | 11/228,531 | 11/228,504 | 11/228,533 | 11/228,502 | 11/228,507 |
| 11/228,482 | 11/228,505 | 11/228,497 | 11/228,487 | 11/228,529 | 11/228,484 | 11/228,489 |
| 11/228,518 | 11/228,536 | 11/228,496 | 11/228,488 | 11/228,506 | 11/228,516 | 11/228,526 |
| 11/228,539 | 11/228,538 | 11/228,524 | 11/228,523 | 11/228,519 | 11/228,528 | 11/228,527 |
| 11/228,525 | 11/228,520 | 11/228,498 | 11/228,511 | 11/228,522 | 111/228,515 | 11/228,537 |
| 11/228,534 | 11/228,491 | 11/228,499 | 11/228,509 | 11/228,492 | 11/228,493 | 11/228,510 |
| 11/228,508 | 11/228,512 | 11/228,514 | 11/228,494 | 11/228,495 | 11/228,486 | 11/228,481 |
| 11/228,477 | 11/228,485 | 11/228,483 | 11/228,521 | 11/228,517 | 11/228,532 | 11/228,513 |
| 11/228,503 | 11/228,480 | 11/228,535 | 11/228,478 | 11/228,479 | 11/246,687 | 11/246,718 |
| 11/246,685 | 11/246,686 | 11/246,703 | 11/246,691 | 11/246,711 | 11/246,690 | 11/246,712 |
| 11/246,717 | 11/246,709 | 11/246,700 | 11/246,701 | 11/246,702 | 11/246,668 | 11/246,697 |
| 11/246,698 | 11/246,699 | 11/246,675 | 11/246,674 | 11/246,667 | 11/246,684 | 11/246,672 |
| 11/246,673 | 11/246,683 | 11/246,682 | 11/482,953 | 11/482,977 | 6,238,115 | 6,386,535 |
| 6,398,344 | 6,612,240 | 6,752,549 | 6,805,049 | 6,971,313 | 6,899,480 | 6,860,664 |
| 6,925,935 | 6,966,636 | 7,024,995 | 10/636,245 | 6,926,455 | 7,056,038 | 6,869,172 |
| 7,021,843 | 6,988,845 | 6,964,533 | 6,981,809 | 11/060,804 | 11/065,146 | 11/155,544 |
| 11/203,241 | 11/206,805 | 11/281,421 | 11/281,422 | 11/482,981 | 11/014,721 | 11/592,996 |
| D.529,952 | 11/482,978 | 11/482,967 | 11/482,966 | 11/482,988 | 11/482,989 | 11/482,982 |
| 11/482,983 | 11/482,984 | 11/495,818 | 11/495,819 | 6,988,841 | 6,641,315 | 6,786,661 |
| 6,808,325 | 6,712,453 | 6,460,971 | 6,428,147 | 6,416,170 | 6,402,300 | 6,464,340 |
| 6,612,687 | 6,412,912 | 6,447,099 | 7,090,337 | 11/478,585 | 6,913,346 | 10/853,336 |
| 11/000,936 | 7,032,998 | 6,994,424 | 7,001,012 | 7,004,568 | 7,040,738 | 11/026,136 |
| 7,131,715 | 11/026,125 | 11/026,126 | 7,097,285 | 7,083,264 | 11/315,357 | 11/450,445 |
| 11/472,294 | 11/503,084 | 6,227,652 | 6,213,588 | 6,213,589 | 6,231,163 | 6,247,795 |
| 6,394,581 | 6,244,691 | 6,257,704 | 6,416,168 | 6,220,694 | 6,257,705 | 6,247,794 |
| 6,234,610 | 6,247,793 | 6,264,306 | 6,241,342 | 6,247,792 | 6,264,307 | 6,254,220 |
| 6,234,611 | 6,302,528 | 6,283,582 | 6,239,821 | 6,338,547 | 6,247,796 | 6,557,977 |
| 6,390,603 | 6,362,843 | 6,293,653 | 6,312,107 | 6,227,653 | 6,234,609 | 6,238,040 |
| 6,188,415 | 6,227,654 | 6,209,989 | 6,247,791 | 6,336,710 | 6,217,153 | 6,416,167 |
| 6,243,113 | 6,283,581 | 6,247,790 | 6,260,953 | 6,267,469 | 6,588,882 | 6,742,873 |
| 6,918,655 | 09/835,707 | 6,547,371 | 6,938,989 | 6,598,964 | 6,923,526 | 09/835,448 |
| 6,273,544 | 6,309,048 | 6,420,196 | 6,443,558 | 6,439,689 | 6,378,989 | 6,848,181 |
| 6,634,735 | 6,299,289 | 6,299,290 | 6,425,654 | 6,902,255 | 6,623,101 | 6,406,129 |
| 6,505,916 | 6,457,809 | 6,550,895 | 6,457,812 | 10/296,434 | 6,428,133 | 11/144,778 |
| 7,080,895 | 11/144,844 | 11/478,598 | 10/882,774 | 10/884,889 | 10/922,890 | 10/922,875 |
| 10/922,885 | 10/922,888 | 10/922,882 | 10/922,876 | 10/922,886 | 10/922,877 | 11/071,251 |
| 11/071,261 | 11/159,193 | 11/491,378 | 6,938,992 | 6,994,425 | 6,863,379 | 11/015,012 |
| 7,066,577 | 7,125,103 | 11/450,430 | 11/545566 | 6,764,166 | 6,652,074 | 10/510,093 |
| 6,682,174 | 6,648,453 | 6,682,176 | 6,998,062 | 6,767,077 | 10/760,214 | 10/962,413 |
| 6,988,789 | 11/006,733 | 11/013,881 | 7,083,261 | 7,070,258 | 11/026,046 | 11/064,011 |
| 11/064,013 | 7,083,262 | 11/080,496 | 11/083,021 | 7,036,912 | 11/087,557 | 11/084,757 |
| 11/281,673 | 11/442,190 | 11/525,857 | 11/485,123 | 6,425,657 | 6,488,358 | 7,021,746 |
| 6,712,986 | 6,981,757 | 6,505,912 | 6,439,694 | 6,364,461 | 6,378,990 | 6,425,658 |
| 6,488,361 | 6,814,429 | 6,471,336 | 6,457,813 | 6,540,331 | 6,454,396 | 6,464,325 |
| 6,435,664 | 6,412,914 | 6,550,896 | 6,439,695 | 6,447,100 | 09/900,160 | 6,488,359 |
| 6,623,108 | 6,698,867 | 6,488,362 | 6,425,651 | 6,435,667 | 6,527,374 | 6,582,059 |
| 6,513,908 | 6,540,332 | 6,679,584 | 6,857,724 | 6,652,052 | 6,672,706 | 7,077,508 |
| 10/698,374 | 6,935,724 | 6,927,786 | 6,988,787 | 6,899,415 | 6,672,708 | 6,644,767 |
| 6,874,866 | 6,830,316 | 6,994,420 | 7,086,720 | 10/982,763 | 10/992,661 | 7,066,578 |
| 7,101,023 | 11/225,157 | 11/272,426 | 11/349,074 | 7137686 | 11/501,858 | 11/583,895 |
| 6,916,082 | 6,786,570 | 10/753,478 | 6,848,780 | 6,966,633 | 10/728,924 | 6,969,153 |
| 6,979,075 | 7,132,056 | 6,832,828 | 6,860,590 | 6,905,620 | 6,786,574 | 6,824,252 |
| 6,890,059 | 10/913,325 | 7,125,102 | 7,028,474 | 7,066,575 | 6,986,202 | 7,044,584 |
| 7,032,992 | 11/015,018 | 11/030,964 | 11/048,748 | 7,008,041 | 7,011,390 | 7,048,868 |

-continued

| | | | | | | |
|---|---|---|---|---|---|---|
| 7,014,785 | 7,131,717 | 11/176,158 | 11/202,331 | 7,104,631 | 11/202,217 | 11/231,875 |
| 11/231,876 | 11/298,635 | 11/329,167 | 11/442,161 | 11/442,126 | 11/478588 | 11/525,861 |
| 11/583,939 | 11/545,504 | 11/583,894 | 10/882,775 | 6,932,459 | 7,032,997 | 6,998,278 |
| 7,004,563 | 6,938,994 | 10/959,135 | 10/959,049 | 10/962,415 | 7,077,588 | 6,918,707 |
| 6,923,583 | 6,953,295 | 6,921,221 | 10/992,758 | 11/008,115 | 11/012,329 | 11/084,752 |
| 11/084,753 | 11/185,720 | 11/177,395 | 11/202,332 | 7,101,020 | 11/336,796 | 11/442,191 |
| 11/525,860 | 6,945,630 | 6,830,395 | 6,641,255 | 10/309,036 | 6,666,543 | 6,669,332 |
| 6,663,225 | 7,073,881 | 10/636,208 | 10/636,206 | 10/636,274 | 6,808,253 | 6,827,428 |
| 6,959,982 | 6,959,981 | 6,886,917 | 6,863,378 | 7,052,114 | 7,001,007 | 7,008,046 |
| 6,880,918 | 7,066,574 | 11/036,021 | 6,976,751 | 11/071,471 | 7,080,893 | 11/155,630 |
| 7055934 | 11/155,627 | 11/159,197 | 7,083,263 | 11/472,405 | 11/484,745 | 11/503,061 |
| 11/544,577 | 7,067,067 | 6,776,476 | 6,880,914 | 7,086,709 | 6,783,217 | 10/693,978 |
| 6,929,352 | 6,824,251 | 6,834,939 | 6,840,600 | 6,786,573 | 10/713,073 | 6,799,835 |
| 6,938,991 | 10/884,890 | 10/884,887 | 6,988,788 | 7,022,250 | 6,929,350 | 7,004,566 |
| 7,055,933 | 11/144,804 | 11/165,062 | 11/298,530 | 11/329,143 | 11/442,160 | 11/442,176 |
| 11/454,901 | 11/442,134 | 11/499,741 | 11/525,859 | 6,866,369 | 6,886,918 | 10/882,763 |
| 6,921,150 | 6,913,347 | 11/033,122 | 7,093,928 | 11/072,518 | 7,086,721 | 11/171,428 |
| 11/165,302 | 11/144,760 | 7,111,925 | 11/455,132 | 11/546,437 | 11/584,619 | |

BACKGROUND OF THE INVENTION

Electronic signal processing will usually induce some level of noise into the output signal. In the transmission of signals, the induced noise is often due to 'lossy' transmission methods. Ordinary workers in this field will understand that 'lossy' refers to processing techniques that move some signal data to nearby data values.

Lossy signal compression techniques make transmission quicker and more efficient but introduce noise when the transmitted signal is compressed. This level of noise can be controlled and restricted to an acceptable level for the vast majority of the transmission. However, there are instances where the signal data at one or more particulars levels within the bandwidth are more important than others. Alternatively, noise at particular levels of the bandwidth has a more detrimental effect than it would at other levels of the bandwidth. The aggressiveness of the compression technique can be set so that the noise in these critical sections is acceptable, but then majority of the bandwidth is only lightly compressed and the data size remains large. Keeping the data size large tends to defeat the purpose of compressing the signal in the first place.

JPEG (Joint Photographic Experts Group) compression of contone image data is one example of a lossy signal compression technique. The noise induced by JPEG compression in particular sections of the bandwidth can cause particularly visible artifacts in the decompressed image. Because of its relevance to the present invention, the detailed description is directed to localized noise reduction in the compression and decompression of an image file. However, it will be appreciated that this is purely illustrative and the invention encompasses other types of signal transmission.

JPEG compression of image data uses one of a suite of standard algorithms to reduce data size for faster transmission and more efficient storage. The quality of the resultant image is determined by the level of compression. An aggressive compression greatly reduces the file size but introduces high levels of noise. Light compression reduces the noise but the data size remains relatively large. Therefore, the optimum level of compression is a trade off between image quality and data size, having regard to the characteristics of the output device (printer or monitor), processing capabilities and resolution requirements.

During JPEG compression, the image is analyzed in blocks of 8×8 pixels. Depending on the level of compression selected, the detail in each of the blocks is reduced. In more aggressive compressions, the 8×8 blocks can become visible in the final image. The compression should be at a level where the noise in the resulting image is imperceptible. Unfortunately, there are often certain components of an image that are far more prone to decompression artifacts than the rest of the image. In these cases, the noise is imperceptible for the majority of the image, but produces artifacts in certain parts.

The noise prone areas are hard edges between strongly contrasting colors such as text on a white background. FIG. 1 is an image of a black shape 10 on a white background 12 without any noise. FIG. 2 shows the associated grayscale histogram for the image. The histogram has 256 levels, with level 0 being white and level 255 being black. A black shape on a white background (without any noise) has pixels in levels 0 or 255 only. All other levels are shades of grey and therefore empty.

FIG. 3 shows the image of FIG. 1 after it has been JPEG compressed and decompressed. The detail lost during compression manifests as random grey scale artifacts 14 around the periphery of the black shape 10. The grey scale artifacts also exist within the black shape 10 but are obscured by the surrounding black. The artifacts 14 are confined to the 8×8 pixel blocks that cross the boundary between the shape and the white background. These artifacts are referred to as JPEG 'ringing'.

FIG. 4 shows the histogram for FIG. 3. While most of the pixels are in level 0 or 255 (white or black), the noise appears in the levels near the two extremities 16 and 18. The noise is restricted to the ends of the histogram because compression tends to cause only small shifts in a pixels color level. In a 'normal' photographic image, most if not all of the intensity levels in each colour plane have some pixels. The noise from compression does not shift the colour levels very far from the original level, and mixes with the other color planes, so the artifacts occur at a high spatial frequency. The eye is insensitive to high frequency noise made up of small colour levels shifts. It is only the sharp edges between strongly contrasting colors where the artifacts become visible.

SUMMARY OF THE INVENTION

Accordingly the present invention provides a method of preserving signal data at a predetermined level within the bandwidth of an input signal to be processed for use by an output device, the method comprising:

rescaling the signal data in levels other than the predetermined level to move at least some of the signal data out of a buffer section of the bandwidth adjacent to the predetermined level;

processing the signal for use by the output device;

re-assigning any data in the buffer section to the predetermined level; and, rescaling the signal data in levels other than the predetermined level to move data back into the buffer section.

Inaccuracies in the signal processing shifts some signal data from its original level in the input signal to different level in the output signal. This shift in data generates the noise in the output signal. If data does shift because of the signal processing, there is a high probability that it only shifts to a nearby level in the bandwidth. If the signal data at a particular level is of greater importance relative to most of the other levels, the invention allows this data to be preserved at its original level with very little, if any, lost to noise.

By rescaling the input signal, most or all of the data in levels near the important level can be shifted away. This effectively creates a buffer on one or both sides of the important level which quarantines the data in this level from the rest of the signal data. Any noise induced in the data from the important level is (highly likely to be) confined to the empty buffer, and so can be easily corrected. By re-mapping all data in the buffer back to the important level, the induced noise is removed. Once the data in the buffer has been mapped back to the important level, the initial rescaling of the input signal can be reversed to distribute signal data across the full bandwidth.

Optionally, the input signal is image data for a color plane of an image and the output device is a printer. In these embodiments, the signal data is pixel intensity values for the color plane quantized into a number of discrete intensity levels, such that the number of levels is the bandwidth of the input signal. In a further preferred form of these embodiments, the predetermined level is the intensity level corresponding to 'white' (or zero color intensity). Optionally, the method preserves the data in a second predetermined level, the second predetermined level being the maximum intensity level in the bandwidth.

Preferably, the processing of the signal involves lossy transmission of the signal data. In a further preferred form, the processing of the signal involves the lossy compression of the signal data. In a still further preferred from, the processing of the signal involves lossy image compression. In a particularly preferred form, the processing of the signal includes JPEG compression.

Optionally, the input signal is resealed by quantizing the image data into a lesser number of the discrete intensity levels except for image data in the or each predetermined level. In a preferred form the image data is resealed to floating point values and then rounded to the closest of the intensity levels.

In a particularly preferred form, the method further comprises converting the image data from a first color space to a second color space wherein the rescaling of the input image data is performed simultaneously with the color space conversion. In this form, the second color space is the printer color space. Optionally, the step of rescaling the image data back into the or each buffer section after JPEG compression is performed via a dither matrix by adjusting the threshold values in the dither matrix.

Preferably, the image includes text characters. Preferably, the image includes line art. Preferably the image has a white background. Optionally, the color intensity values are 8-bit values and the bandwidth of the input signal is 256 levels. Optionally the predetermined level is '0'. Optionally, the second predetermined level is '255'. Optionally, the buffer section corresponding to level 0 is levels 1 to 16. Optionally, the buffer section corresponding to level 255 is levels 240 to 254.

BRIEF DESCRIPTION OF THE DRAWINGS

The invention will now be described by way of example only, with reference to the embodiments shown in the accompanying drawings, in which.

DETAILED DESCRIPTION OF PREFERRED EMBODIMENTS

Figure 1:
FIG. 1 is an image that is particularly prone to JPEG ringing.
Figure 3:
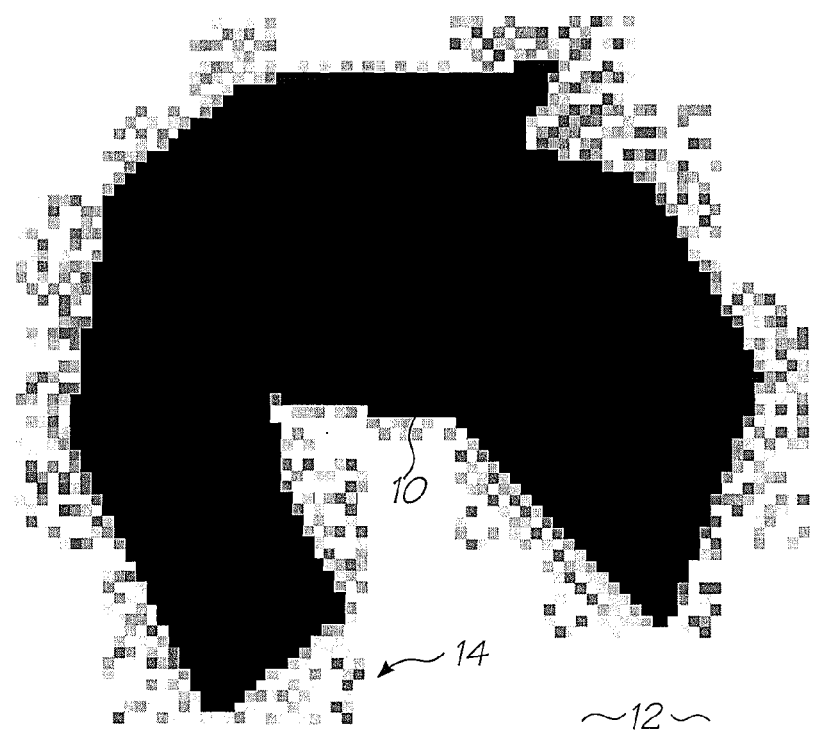
FIG. 3 is the image of FIG. 1 with JPEG compression noise or 'ringing' around the hard edges.
Figure 2:
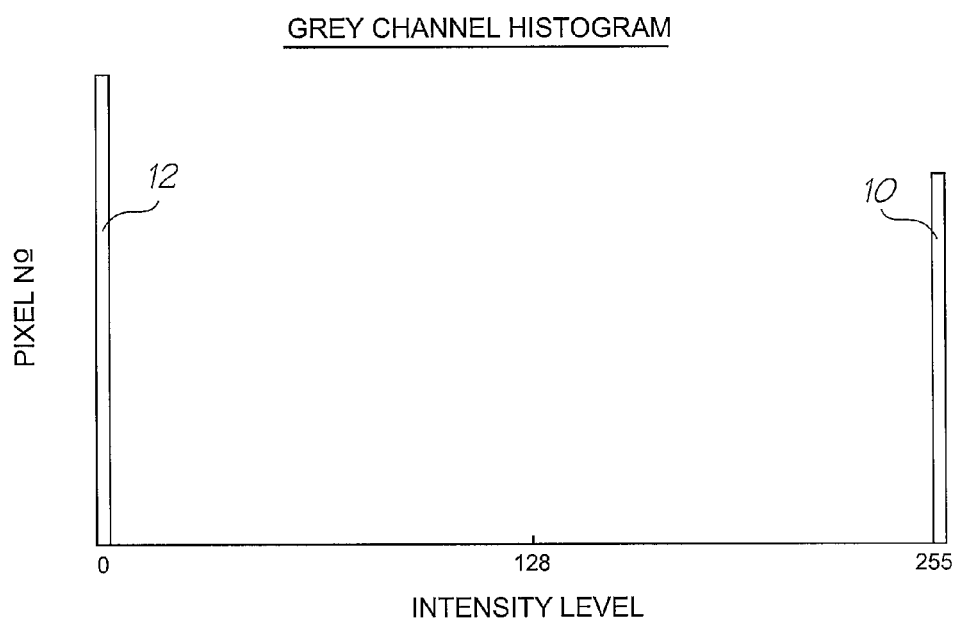
FIG. 2 is the histogram associated with the image of FIG. 1.

As discussed in the Background to Invention, FIG. 1 shows an image 10 on a white background 12. The edge of the shape 10 is referred to as a 'hard edge' because the color intensity values drop from maximum intensity to zero (white) instantly. As there are no transition colors in the image, the histogram shown in FIG. 2 only has data in levels 0 and 255 (8 bit color values).

Figure 4:
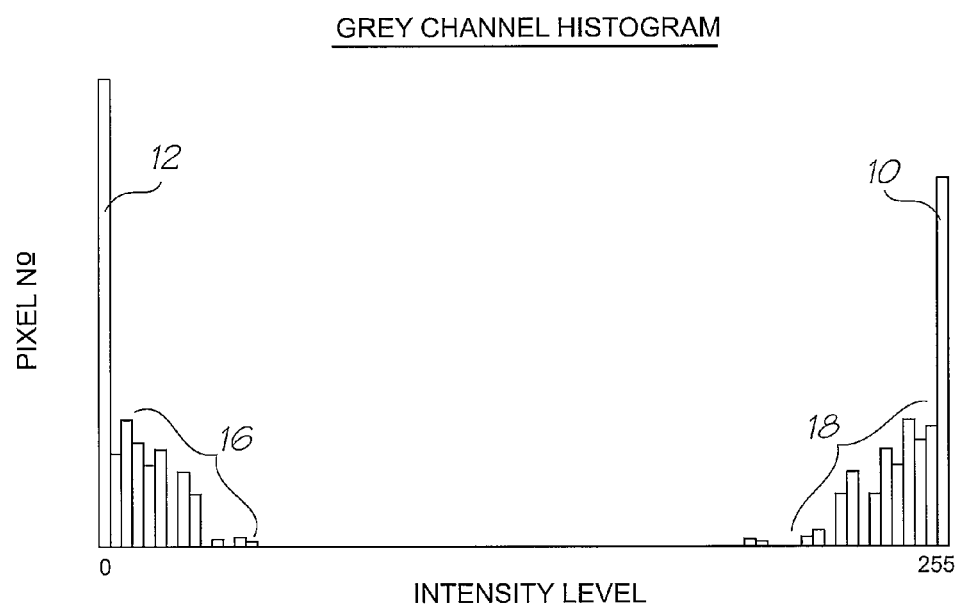
FIG. 4 is the histogram associated with the image of FIG. 3.

When the image of FIG. 1 is JPEG compressed for efficient transmission, and subsequently decompressed at the output device, the edge of the shape 10 is surrounded grey pixel noise 14. The noise 14 is sometimes referred to as mosquito noise as it is most visible as a cloud of dark dots on the light side of a hard edge such as text or line art. The loss of detail in the data during compression can shift pixels color values away from their input values. These shifts are likely to be small so in a contone image with smoother tone gradients, the noise is high frequency and invisible to the eye. However, the noise can become visible around hard edges where input data at level '0' shifts to nearby grey levels from decompression errors. This noise 14 is shown in the histogram of FIG. 4. Input data at level '255' also shifts but is less visible amongst the predominantly level 255 pixels. This noise is shown at 18 on the histogram of FIG. 4.

Figure 5:
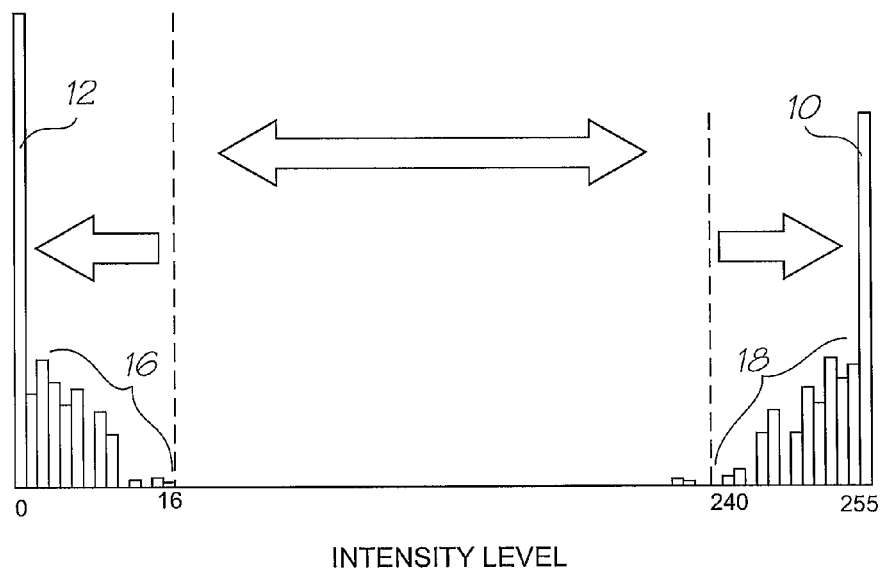
FIG. 5 is the histogram associated with the image of FIG. 1 with the buffer sections set at levels 1-16 and 240-254.

FIG. 5 shows the settings for a histogram expansion to remedy the majority of the noise. Ordinary workers in this field will appreciate that a histogram expansion rescales the input data by reducing the number of levels in the bandwidth. In FIG. 5, levels 1 to 16 are mapped down to level 0 and levels 240 to 254 are mapped up to level 255. Then the intermediate levels are resealed, or widened, to encompass the greys between the extremes. The resulting histogram has fewer levels (224), with more contrast between adjacent levels.

Figure 6:
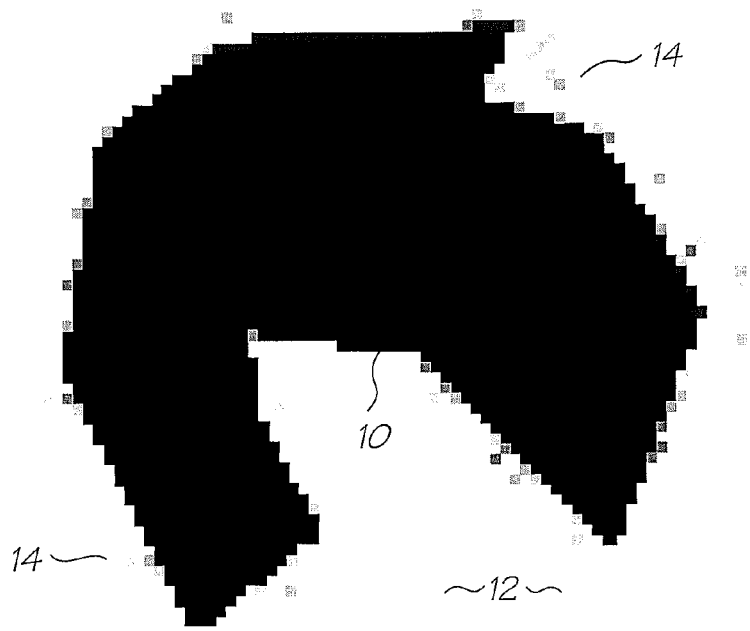
FIG. 6 shows the image of FIG. 3 with the noise in the low and high buffer sections mapped to levels 0 and 255 respectively.

Ordinarily, the increased color contrast is the primary purpose of histogram expansion, but in this case, the expansion has corrected most of the noise 14 as shown in FIG. 6. There is still some 'ringing' on either side of the edge between the shape 10 and the white background 12, and this could be corrected with a more aggressive histogram expansion, but in contone images, a harsh reduction in levels leads to visible contouring in areas of gradual tone variation. Ordinary workers will appreciate that each system will have an optimum compromise between clipping all the noise and degrading the number of color levels.

It will also be appreciated that the buffers need not be the same size or symmetrically positioned in the signal bandwidth. It should also be noted that the buffers need not be at the extremes of the bandwidth. For example, if the signal is image data in a YCC-style color space (luminance, chroma red and chroma blue), the important data in the chroma channels is the neutral level in the middle of the bandwidth (level 128 in 8 bit color values). The important data in the luminance channel is at the extremes.

Figure 7:
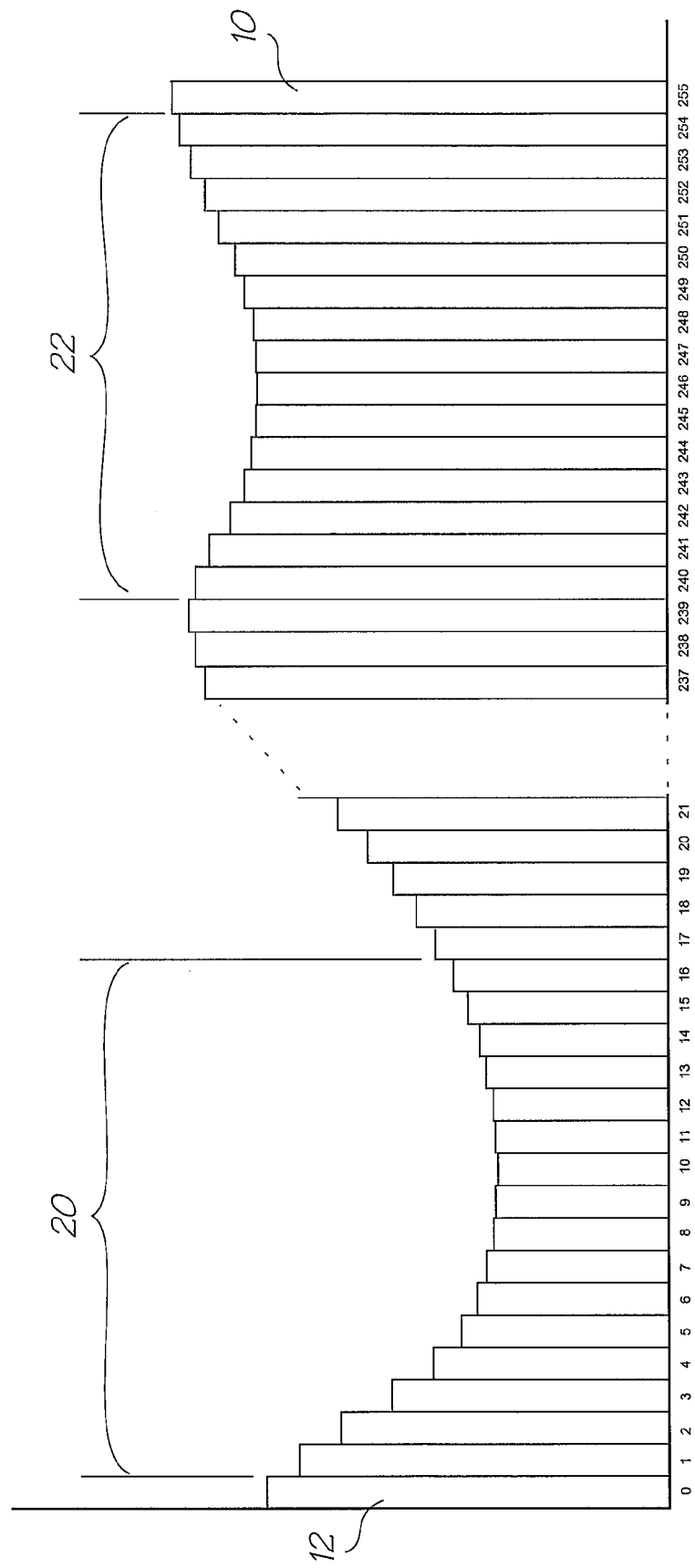
FIG. 7 is a sketch of the end portions of a histogram.

The image of FIG. 1 only has data in levels 0 and 255, whereas most images have a much broader distribution of the data—usually across the full bandwidth. FIG. 7 is a schematic representation of the histogram corresponding to a contone image such as a photograph. The image has some pixels at all levels of the 0 to 255 bandwidth. For storage and transmission, the image is typically JPEG compressed and then decompressed at the output device. Depending the quality of JPEG compression selected, the number of pixels in the output levels should be roughly the same as the corresponding input levels. Any errors that do occur, most likely put the pixel into a nearby level and this happens at high frequency so the noise is imperceptible. The exception to this is the hard edged components of the image such as text on a white background or line art. The eye does tend to register the noise generated in the 8×8 pixel blocks that span or contain such edges.

In these areas, all pixels that were level 0 in the input image should be preserved as level 0 pixels in the output image in order to avoid the visible ringing. Likewise level 255 pixels in the input image should be kept at that level in the output image although this is usually a less visible artifact.

The quality of the JPEG compression is known, and so the section on the bandwidth in which the majority of noise induced in the level 0 pixels 12 is also known. These buffer sections 20 and 22 of the bandwidth are chosen as levels 1-16 and levels 240-254. For the purposes of this example, the vast majority of noise induced by decompressing levels 0 and 255 will appear in these buffer sections.

Figure 8:
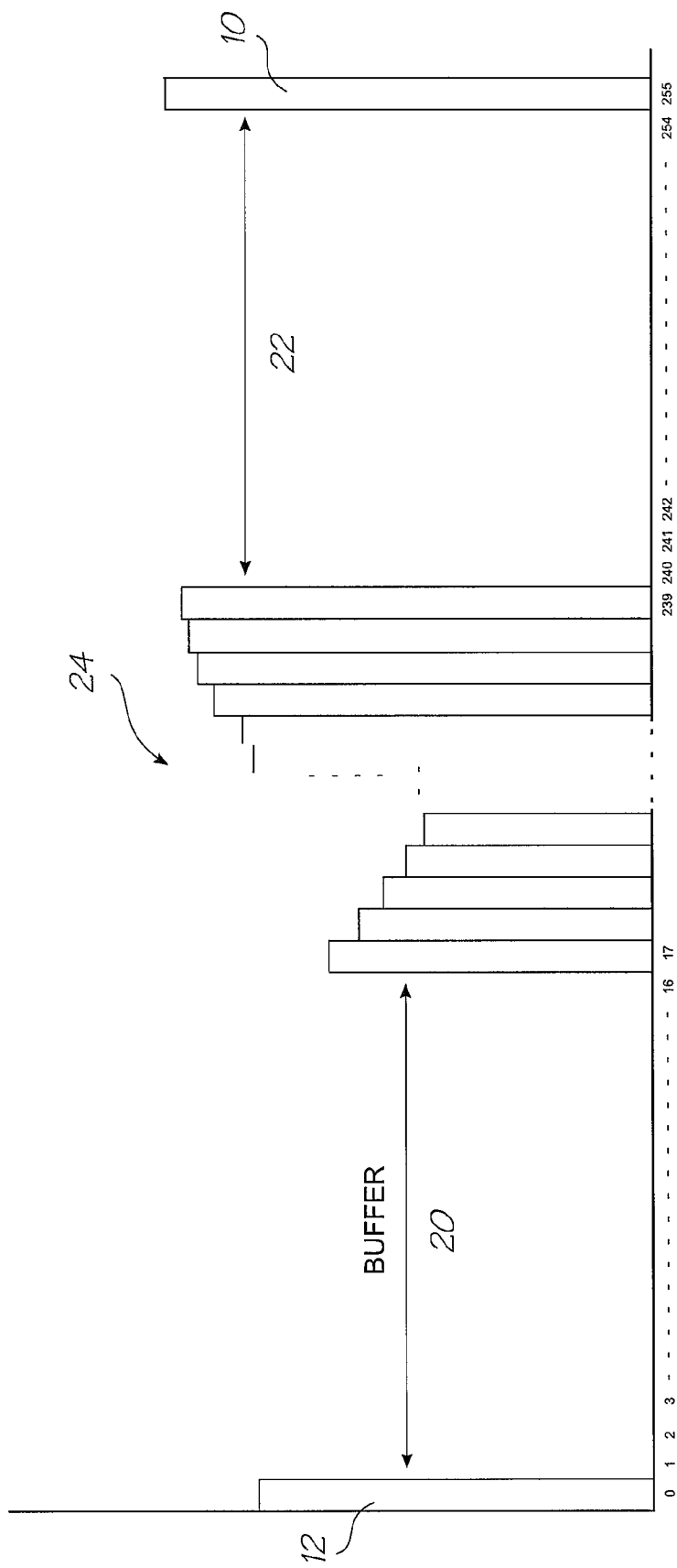
FIG. 8 is a sketch of the end portions of the histogram with the data moved out of the buffer sections.

FIG. 8 shows the image data moved out of the buffer section 20 and 22 by rescaling the input data 24 of levels 1-254 into levels 17 to 239. Rescaling is done using a simple algorithm such as Equation 1 below:

$$L_r = L_1 + L_i \cdot (L_h - L_1)/((L_{max}-1) - L_{min}) \qquad \text{eq.1}$$

Where:
$L_r$ is the resealed level that the pixels in the input level are mapped to;
$L_1$ is the threshold of the buffer section at the lower end of the bandwidth;
$L_h$ is the threshold of the buffer section at the upper end of the bandwidth;
$L_i$ is the input level being resealed;
$L_{max}$ is the upper extremity of the bandwidth; and,
$L_{min}$ is the lower extremity of the bandwidth.

In the example shown in FIGS. 7-10, $L_{max}$=255, $L_{min}$=0, $L_1$=16 and $L_h$=239. So Eq.1 becomes:

$$L_r = 16 + 0.878 \cdot L_i$$

$L_r$ can be rounded to the nearest integer or left as a floating point value to more accurately invert the rescaling process when the input data 24 is distributed back across the full bandwidth.

FIG. 8 shows levels 1 to 254 resealed to move the input data out of the buffer sections 20 and 22. The data 12 and 10 in levels 0 and 255 respectively, is not rescaled. This is the data that is being 'quarantined' from the rest of the data 24 by the buffer sections 20 and 22.

Figure 9:
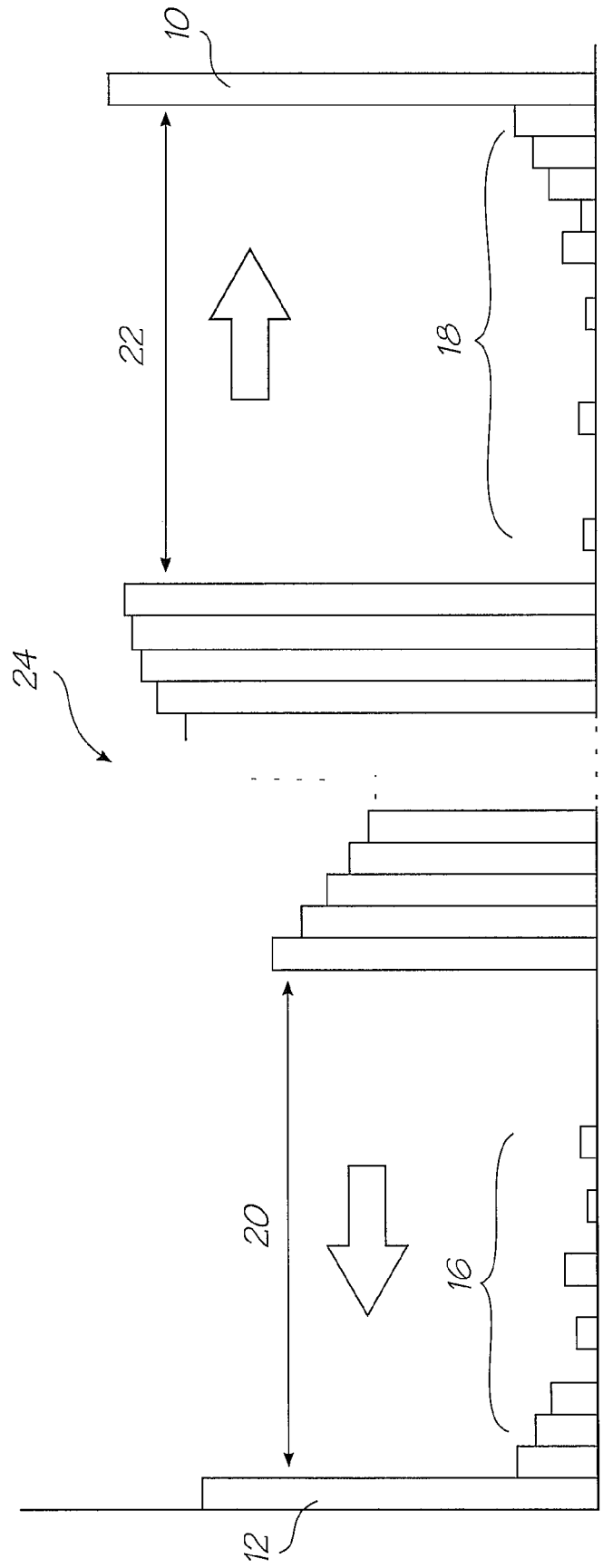
FIG. 9 is a sketch of the end portions of the histogram after JPEG decompression.

FIG. 9 shows the histogram corresponding to the image data after it has been JPEG compressed, transmitted to an output device and subsequently decompressed. The data 16 and 18 in the buffer sections 20 and 22 must be noise from levels 0 or 10 (or from the rest of the image data 24, but as explained above, this noise is generally invisible to the eye). Therefore, mapping the data in buffer 20 back to level 0 and mapping the data in buffer 22 up to level 255 will correct any noise that would otherwise turn up in the white background or the full color side of a hard edge component in the image. Some noise in the buffers is from the rest of the data 24. These pixels are also mapped to 0 or 255 and so end up slightly more erroneous in the output image, but the eye will not be able to see this.

Figure 10:
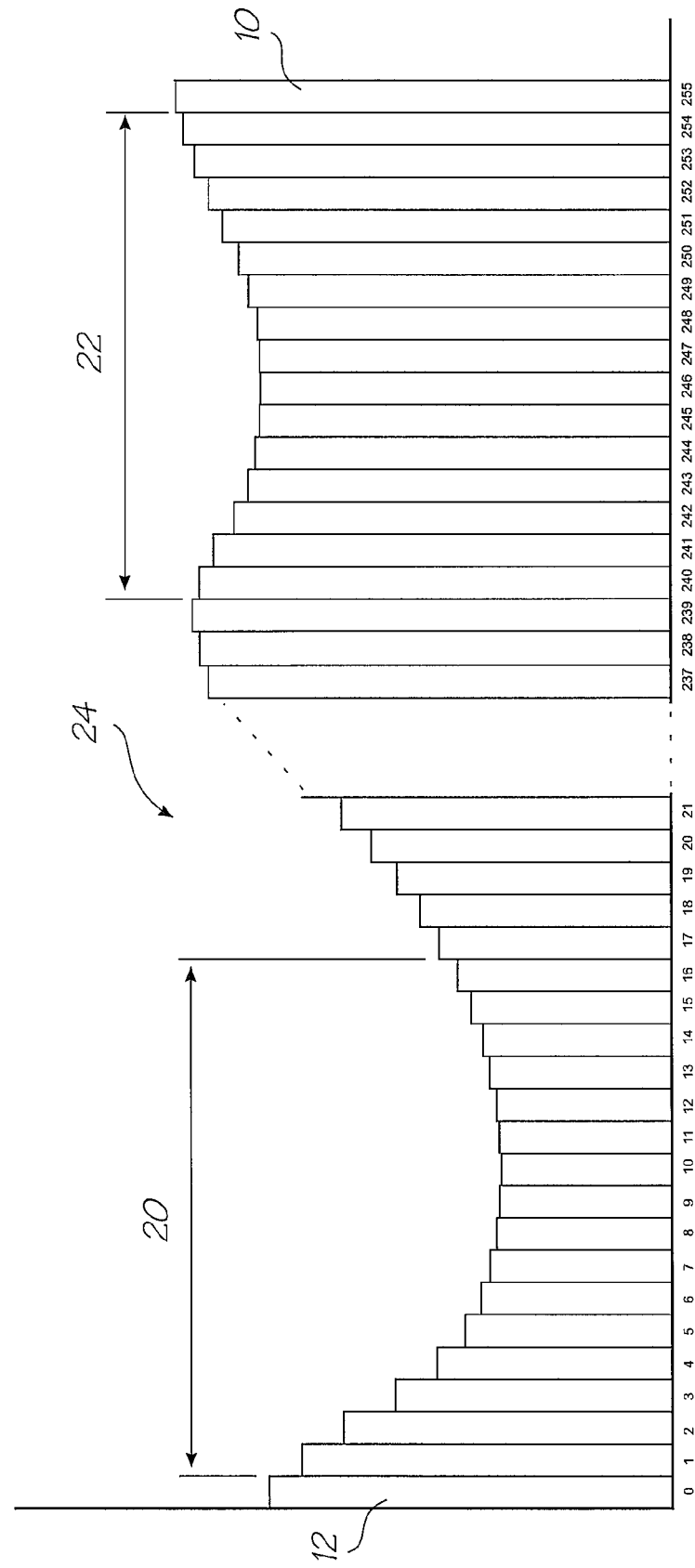
FIG. 10 is a sketch of the histogram resealed to distribute data back into the buffer sections.

Once the noise in levels 0 and 255 has been corrected, the rest of the data 24 can be redistributed back into the now vacant buffer sections 20 and 22, as shown in FIG. 10. This is done by simply reversing Equation 1. Because the bandwidth was resealed to a smaller number of levels, expanding the data back out to the full bandwidth will mean the loss of some levels due to rounding. This means that the resulting contone image will be quantized slightly more coarsely. However, sacrificing 32 levels still leaves 224 which is ample for photographic quality image reproduction by the output device. Indeed, 90 to 100 levels is often deemed sufficient.

It should also be noted that the manipulation of the image data can be achieved in a computationally efficient way by incorporating it into existing data processing steps. The rescaling of the signal to move data out of the buffer sections can be done when the image data is color space converted from RGB to CMY(K). Furthermore, the re-distribution of data back across the full bandwidth can be done by adjusting the threshold values used in the dither matrix during halftoning. The Applicant's co-pending U.S. Ser. No. 11/482,980 incorporated herein by reference describes how the histogram can be expanded (or contracted) using the dither matrix. In light of this, the computational cost for preserving the data at one or more levels in the bandwidth is relatively little, yet the tangible image quality improvement is significant. The threshold values in the compressed range in the secondary matrix are determined using Equation 2:

$$T_{new} = L_1 + T_{old} \cdot (L_h - L_1)/256 \qquad \text{Eq. 2}$$

where:
$T_{new}$ is the compressed threshold values in the secondary dither matrix; and,
$T_{old}$ is the threshold value in the primary dither matrix.

The adjusted dither matrix will not affect data at the extreme levels of the bandwidth as level 0 will still be below the lowest threshold value and level 255 will still be above the highest threshold level. Only data in the levels between the buffer sections will be 'expanded' by the adjusted dither matrix.

As discussed above, the noise in the white background of a hard edge is more visible than the noise in the full color area along the edge. This is particularly true if the output device is a printer. In light of this, only the data in level 0 can be preserved for a significant reduction in noise. This reduces the rescaling of the remaining signal so that when it is expanded back to the full bandwidth, less levels are lost and the contone image is not as coarse.

Figure 12:
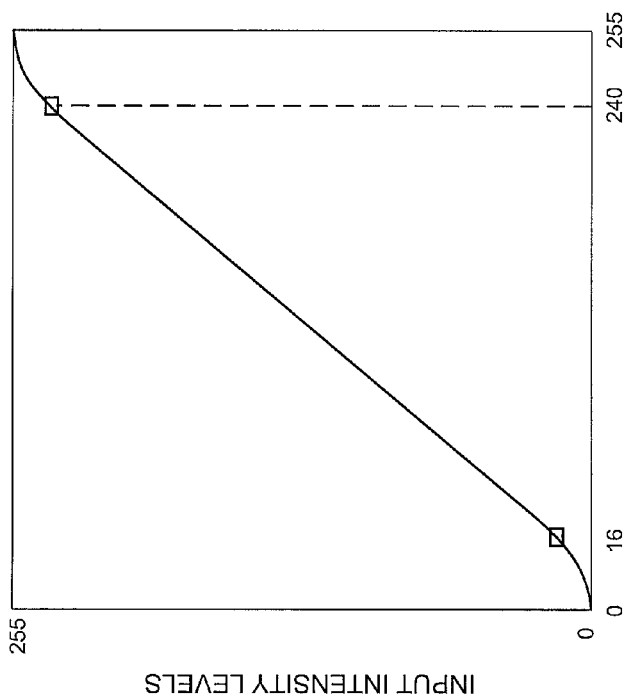
Figure 11:
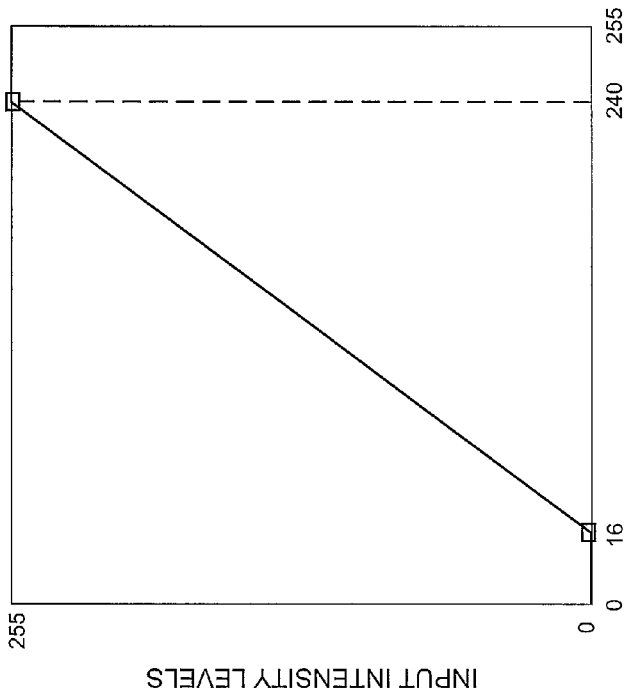
FIG. 11 shows the rescaling of the input image data to create the buffer sections; and, FIG. 12 shows an alternative rescaling technique of the input image data.

In other embodiments, the input signal is rescaled in a manner different to that the technique set out in Equation 1. FIG. 11 shows the hard edged rescaling used in the above example. All the data in the buffer sections is shifted to the levels between 16 and 240. However, the output image may be improved by rescaling the image with a non-linear function as shown in FIG. 12 where most of the data is removed from the buffer sections but not all. Of course, Equations 1 and 2 would not apply to this method of rescaling.

The invention has been described herein by way of example only. Skilled workers in this field will readily recognize many variations and modification that do not depart from the spirit and scope of the broad inventive concept.

The invention claimed is:

1. A method of processing signal data, the signal data resulting from lossy compression and decompression of an input signal, the input signal having at least one known data value, the method comprising:
for each known data value, mapping data values in a buffer section adjacent to the known data value to the known data value; and,
rescaling data values other than the known data values to move data values back into the buffer section.

2. A method according to claim 1 wherein the input signal is image data for a color plane of an image.

3. A method according to claim 2 wherein the signal data is pixel intensity values for the color plane quantized into a number of discrete intensity levels.

4. A method according to claim 3 wherein the at least one known data value includes the intensity level corresponding to zero color intensity.

5. A method according to claim 4 wherein the at least one known data value includes a maximum intensity level.

6. A method according to claim 1 wherein the signal data is image data and the method further comprising the step of converting the image data from a first color space to a second color space, wherein the rescaling of the data values is performed simultaneously with the color space conversion.

7. A method according to claim 6 wherein the second color space is a printer color space.

8. A method according to claim 6 wherein the step of rescaling the image data back into the buffer section is performed via a dither matrix by adjusting the threshold values in the dither matrix.

9. A method according to claim 1 wherein the signal data is image data in a YCC-style color space, and the at least one known data value is an intermediate data value.

10. A method according to claim 1 wherein the buffer section is approximately 6% of the bandwidth.

* * * * *